United States Patent
Komiyama et al.

(10) Patent No.: US 7,034,482 B2
(45) Date of Patent: Apr. 25, 2006

(54) REGENERATION CONTROL FOR HYBRID VEHICLE

(75) Inventors: Susumu Komiyama, Yokohama (JP);
Hiroshi Iwano, Yokohama (JP);
Musashi Yamaguchi, Yokohama (JP);
Hideaki Watanabe, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/062,610

(22) Filed: Feb. 22, 2005

(65) Prior Publication Data

US 2005/0189894 A1 Sep. 1, 2005

(30) Foreign Application Priority Data

Mar. 1, 2004 (JP) .............................. 2004-056032

(51) Int. Cl.
*H02P 3/00* (2006.01)
(52) U.S. Cl. ...................... 318/376; 318/370; 318/372; 318/139; 303/152; 180/65.2; 180/65.4
(58) Field of Classification Search ................ 318/139, 318/370–378, 140, 362; 303/152; 320/104; 180/65.2, 65.4
See application file for complete search history.

(56) References Cited

U.S. PATENT DOCUMENTS

| | | | | |
|---|---|---|---|---|
| 6,739,418 | B1 * | 5/2004 | Ogata et al. ................ | 180/65.2 |
| 2002/0157883 | A1 * | 10/2002 | Ogata et al. ................ | 180/65.4 |
| 2003/0132044 | A1 * | 7/2003 | Kitano et al. ............... | 180/65.2 |
| 2004/0227480 | A1 * | 11/2004 | Kato et al. .................. | 318/376 |
| 2005/0088139 | A1 * | 4/2005 | Frank .......................... | 320/104 |
| 2005/0218717 | A1 * | 10/2005 | Nishina et al. ............. | 303/152 |

FOREIGN PATENT DOCUMENTS

JP 2001-238303 A 8/2001

\* cited by examiner

*Primary Examiner*—Paul Ip
(74) *Attorney, Agent, or Firm*—Foley & Lardner LLP

(57) ABSTRACT

Disclosed is a control apparatus for a hybrid vehicle having an engine, a drive motor (3) that regenerates power, and an electric power storage device (6) that gives/receives power to/from the drive motor (3). The control apparatus includes power consumption means (2) for consuming power; a sensor (26, 27) that detects a state of charge of the electric power storage device; means (18, 23, 51) for detecting a driving state of the vehicle; and a controller (9). The controller (9) is programmed to calculate a chargeable energy amount Ecap in the electric power storage device (6) on the basis of a difference between a fully charged state of the electric power storage device and the detected state of charge; set a power |Pgen0| regenerated by the drive motor (3); calculate a chargeable power Pmax in the electric power storage device according to the detected state of charge; calculate a regenerated energy E resulting from regenerative braking from the detected driving state of the vehicle; calculate a charging power limit Pgenlmt according to the calculated regenerated energy E; and control the power consumption means (2) to consume a power equal to a difference between the power |Pgen0| regenerated by the drive motor (3) and the charging power limit |Pgenlmt| when the calculated regenerated energy E is greater than the chargeable energy amount Ecap in the electric power storage device and when the charging power limit |Pgenlmt| is smaller than the chargeable power |Pmax|.

14 Claims, 14 Drawing Sheets

@# REGENERATION CONTROL FOR HYBRID VEHICLE

FIELD OF THE INVENTION

This invention relates to regeneration control of a hybrid vehicle.

BACKGROUND OF THE INVENTION

A hybrid vehicle comprises an engine and a drive motor as its driving force sources. The drive motor generates power through rotation of driving wheels in braking the vehicle, and the generated power is accumulated as regenerated energy. This is known as an art called regenerative braking.

In this regenerative braking, at the time of abrupt braking or the like, regenerated power may exceed the power with which a battery can be charged.

In a hybrid vehicle disclosed in JP-2001-238303-A that was published by the Japan Patent Office in 2001, when regenerated power has exceeded the power with which a battery can be charged, surplus power is consumed by driving a motor/generator and an engine connected to the motor/generator. In addition, when there is a large amount of surplus power, the load applied to the engine is enhanced by actuating an auxiliary brake, so the power consumed by the motor/generator is increased.

SUMMARY OF THE INVENTION

In the prior art, however, when the electric power storage device (e.g. battery) has a small capacity, the charging power for the electric power storage device is frequently restricted because of its fully charged state and, as a result, the rotation speed of the engine often increases abruptly to consume surplus power. An abrupt change in engine rotation speed makes the driver of the vehicle feel a sense of disagreement or makes it impossible to realize a desired braking force, and hence, may adversely affect the driving performance of the vehicle.

It is therefore an object of this invention to prevent the rotation speed of an engine of a hybrid vehicle from changing abruptly when regenerated energy exceeds an amount of power with which an electric power storage device can be charged during regeneration.

In order to achieve the above object, this invention provides a control apparatus for a hybrid vehicle comprising an engine, a drive motor that regenerates power, and an electric power storage device that gives/receives power to/from the drive motor wherein a driving force from at least one of the engine and the drive motor is transmitted to a drive shaft of the vehicle. The control apparatus comprises power consumption means for consuming power; a sensor that detects a state of charge of the electric power storage device; means for detecting a driving state of the vehicle; and a controller. The controller is programmed to calculate a chargeable energy amount in the electric power storage device on the basis of a difference between a fully charged state of the electric power storage device and the detected state of charge; set a power regenerated by the drive motor; calculate a chargeable power in the electric power storage device according to the detected state of charge; calculate a regenerated energy resulting from regenerative braking from the detected driving state of the vehicle; calculate a charging power limit for preventing an abrupt change in charging power with which the electric power storage device is charged, according to the calculated regenerated energy; and control the power consumption means to consume a power equal to a difference between the power regenerated by the drive motor and the charging power limit when the calculated regenerated energy is greater than the chargeable energy amount in the electric power storage device and when the charging power limit is smaller than the chargeable power.

The details as well as other features and advantages of this invention are set forth in the remainder of the specification and are shown in the accompanying drawings.

PREFERRED EMBODIMENT OF THE INVENTION

Figure 1:
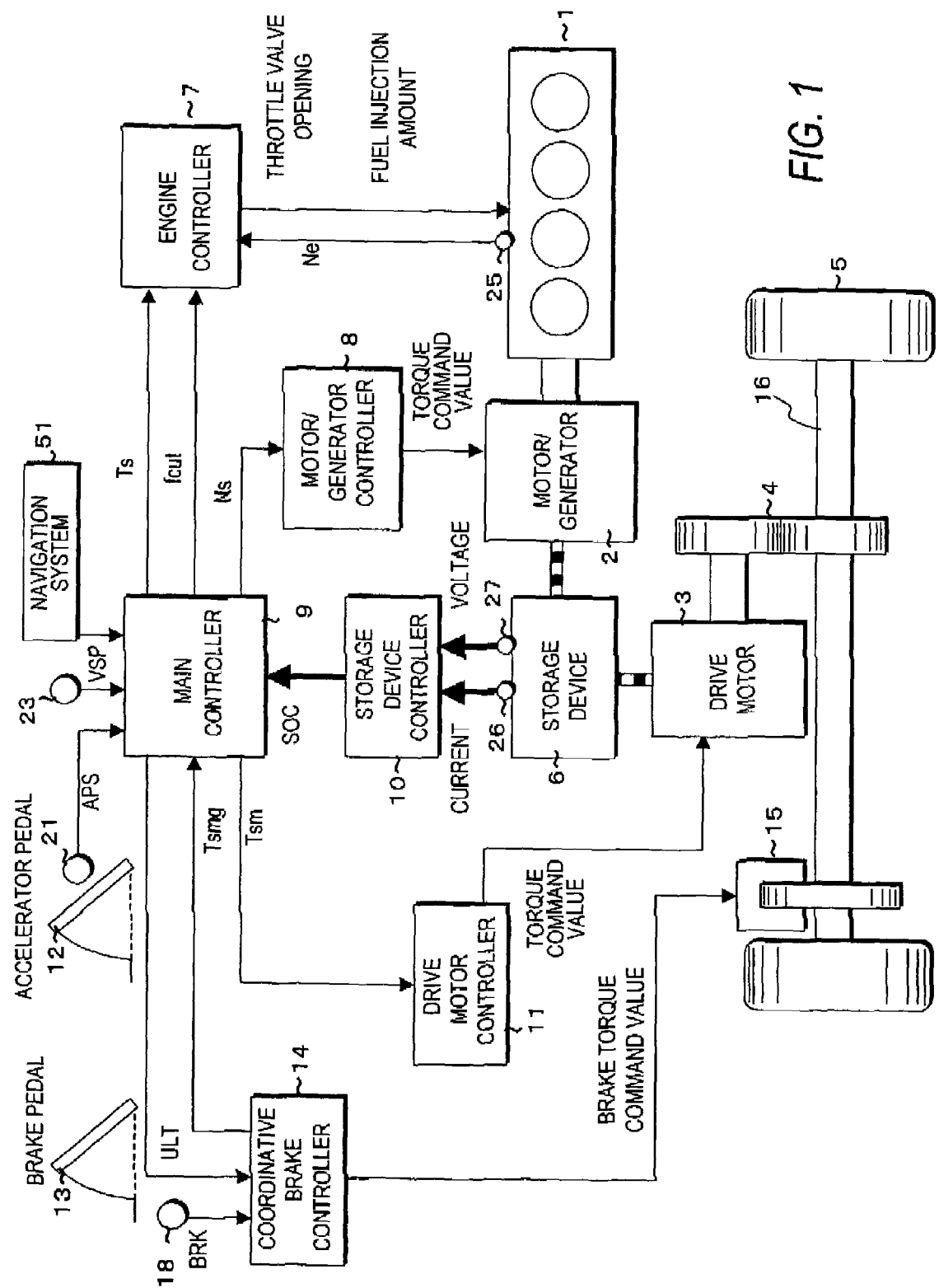
FIG. 1 is a schematic block diagram of a hybrid vehicle according to an embodiment.

FIG. 1 shows a series hybrid vehicle to which this embodiment is applied.

The hybrid vehicle comprises an engine 1, a motor/generator 2, an electric power storage device 6, and a drive motor 3. The motor/generator 2 is directly coupled to the engine 1 and converts the output of the engine 1 into electric power. The electric power storage device 6 accumulates the power generated by the motor/generator 2. The drive motor 3 is driven by the power generated by the motor/generator 2 and/or the power accumulated in the electric power storage device 6. The motor/generator 2 mainly generates power but can also consume the power from the electric power storage device 6 or the regenerated power from the drive motor 3. Therefore, the motor/generator 2 functions as power generating means or power consuming means. The engine 1, the motor/generator 2, and the drive motor 3 constitute a power train. The torque of the drive motor 3 is transmitted to wheels 5 (tires) via a final gear 4 and a drive shaft 16. A mechanical brake 15 such as a disk brake or a drum brake is installed on the drive shaft 16. The engine 1 comprises a throttle valve for adjusting the amount of intake air and fuel injectors for injecting fuel.

A main controller 9 receives a signal from an accelerator pedal sensor 21 for detecting a depression amount (or stroke) APS of an accelerator pedal 12 and a signal from a vehicle speed sensor 23 for detecting a vehicle speed VSP. Based on the depression amount APS of the accelerator pedal and the vehicle speed VSP, the main controller 9 calculates and outputs various command values which will be described later.

An engine controller 7 controls the throttle valve opening and fuel injection amount of the engine 1 on the basis of an engine torque command value Ts, a fuel cut signal fcut, and the like that are output from the main controller 9.

A motor/generator controller 8 calculates a torque command value for the motor/generator 2 on the basis of the difference between a rotation speed command value output from the main controller 9 and an actual rotation speed, and performs vector control of the torque of the motor/generator 2 on the basis of the calculated torque command value.

A storage device controller 10 calculates a state of charge (SOC) of the electric power storage device 6 on the basis of a current and/or voltage of the electric power storage device 6, and outputs the state of charge of the electric power storage device 6 to the main controller 9. It is well known how to calculate the SOC of the electric power storage device 6. For example, the SOC of the electric power storage device 6 is obtained by integrating over time the charging and discharging current or by a direct calculation from voltage. A current sensor 26 detects the current of the electric power storage device 6, and a voltage sensor 27 detects the voltage of the electric power storage device 6. At least one of the current sensor 26 and the voltage sensor 27 functions as a sensor for detecting the state of charge of the electric power storage device 6.

A drive motor controller 11 performs vector control of the drive motor 3 on the basis of a torque command value Tsm outputted from the main controller 9.

A coordinative brake controller 14 performs coordinative regeneration for coordinating regenerative braking with braking by the mechanical brake 15. The coordinative brake controller 14 receives a signal from a brake pedal sensor 18 that detects a depression amount (or stroke) BRK of a brake pedal 13, and calculates a target braking force of the vehicle and a braking force distribution ratio between front and rear wheels on the basis of the value BRK. The coordinative brake controller 14 receives an upper-limit value ULT of regenerative motor torque from the main controller 9, calculates a regenerative motor torque command value Tsmg and a torque command value for the mechanical brake 15 from the upper-limit value, the aforementioned target braking force, and the aforementioned braking force distribution ratio between the front and rear wheels, and transmits the calculated values to the main controller 9 and the mechanical brake 15 respectively. Because the brake 15 operates hydraulically, the brake torque command value is converted into a brake oil pressure when braking is actually carried out by the mechanical brake 15. The regenerative motor torque command value Tsmg causes regenerative braking of the drive motor 3. The regenerative motor torque command value Tsmg and torque command value for the mechanical brake 15 may increase with an increase of the depression amount BRK of a brake pedal 13.

Each of the engine controller 7, the motor/generator controller 8, the main controller 9, the storage device controller 10, the drive motor controller 11, and the coordinative brake controller 14 comprises a microcomputer having a central processing unit (CPU), a read-only memory (ROM), a random access memory (RAM), and an input/output interface (I/O interface). Those controllers may also be integrated into a single microprocessor-based controller.

Figure 2:
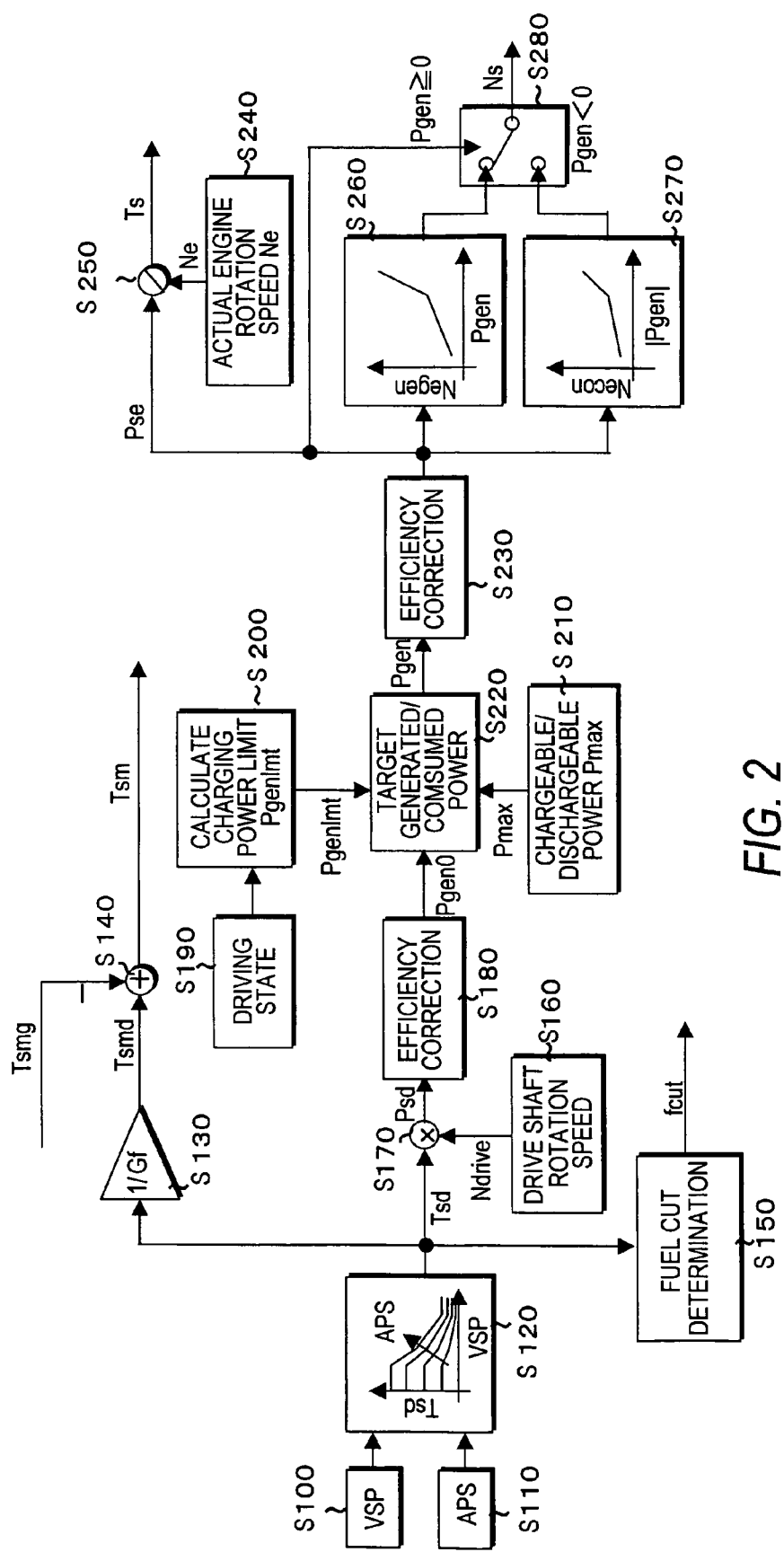
FIG. 2 is a block diagram showing a control routine of the embodiment.

Referring to the block diagram of FIG. 2, a control routine performed by the main controller 9 will be described. The control routine is repeated at intervals of a certain period such as 10 milliseconds. A memory of the main controller 9 stores various maps or tables used in the control routine.

In a step S100, a vehicle speed VSP detected by the vehicle speed sensor 23 is read.

In a step S110, an accelerator pedal depression amount APS detected by the accelerator pedal sensor 21 is read.

Figure 3:
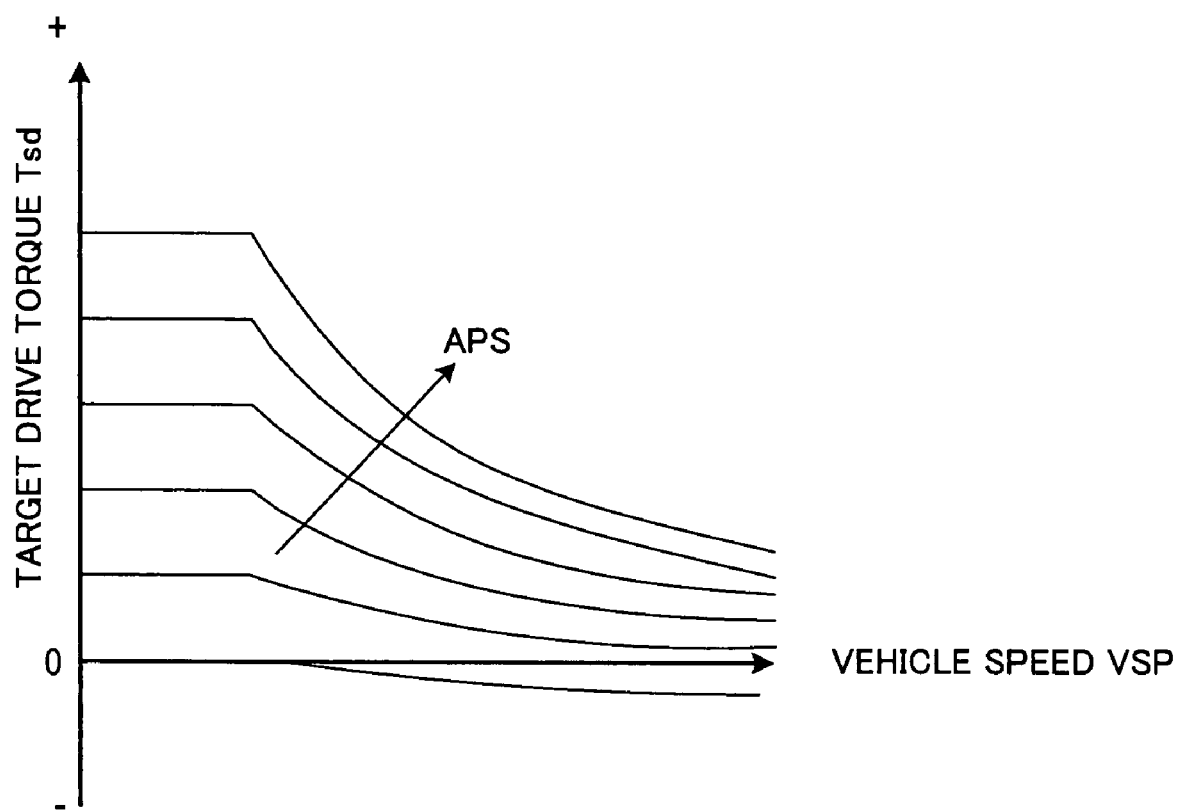
FIG. 3 is a map defining how a vehicle speed and an accelerator pedal depression amount are related to a target driving force.

In a step S120, referring to the map shown in FIG. 3, a target drive torque Tsd of the drive shaft 16 is calculated from the vehicle speed VSP and the accelerator pedal depression amount APS. The map in FIG. 3 defines how the vehicle speed VSP is related to the target drive torque Tsd of the drive shaft 16 for each accelerator pedal depression amount APS.

In a step S130, a basic drive torque command value Tsmd for a shaft of the drive motor is calculated by dividing the target drive torque Tsd by a reduction ratio Gf of the final gear 4 (Tsmd=Tsd/Gf). The reduction ratio Gf is stored in the memory of the main controller 9.

In a step S140, a drive motor torque command value Tsm as a torque command value for the shaft of the drive motor is calculated by subtracting a regenerative motor torque command value Tsmg for the motor shaft, which is input from the coordinative brake controller 14, from the basic drive torque command value Tsmd (Tsm=Tsmd−Tsmg). If the regenerative motor torque command value Tsmg is zero, the drive motor torque command value Tsm equals the basic drive torque command value Tsmd. The drive motor torque command value Tsm is output from the main controller 9 to the drive motor controller 11. The drive motor controller 11 performs vector control of the torque of the drive motor 3 on the basis of the drive motor torque command value Tsm. At the time of regeneration (braking), the regenerative motor torque command value Tsmg takes a positive value.

In a step S150, based on the target drive torque Tsd of the drive shaft calculated in the step S120, it is determined whether or not the supply of fuel is to be suspended.

More specifically, when the target drive torque Tsd of the drive shaft takes a positive value (i.e., when the drive motor 3 is in a power consumption mode), a fuel cut signal fcut indicates zero, which means fuel injection. When the target drive torque Tsd of the drive shaft takes a negative value or zero (i.e., when the drive motor 3 is in a regeneration mode), the fuel cut signal fcut indicates 1, which means the suspension of fuel supply.

The fuel cut signal fcut and a later-described engine torque command value Ts are output from the main controller 9 to the engine controller 7. Based on the engine torque command value Ts, the engine controller 7 controls the throttle opening and fuel injection amount of the engine 1 and thus controls the torque thereof.

In a step S160, a rotation speed Ndrive of the drive shaft 16 is calculated on the basis of the vehicle speed VSP and a tire radius.

In a step S170, a target driving power Psd is calculated by multiplying the target drive torque Tsd of the drive shaft 16 by the drive shaft rotation speed Ndrive (Psd=Ndrive×Tsd).

In a step S180, a loss Ploss1 caused in the drive motor 3 is estimated, and for the purpose of efficiency correction, the sum of the loss Ploss1 and the target driving power Psd is calculated as a temporary target generated power Pgen0 (Pgen0=Ploss1+Psd). When the drive motor 3 can regenerate power, the temporary target generated power Pgen0 takes a negative value. It should be noted that −Pgen0(=|Pgen0|) is equal to the regenerated power of the drive motor 3.

For instance, the method of estimating the loss Ploss1 in the drive motor includes the storage of a drive motor loss map, which has been prepared by previously measuring a loss for each combination of torque and rotation speed, into a memory, and the subsequent calculation of the loss Ploss1 from the drive motor torque command value Tsm and an actual rotation speed of the drive motor 3 with reference to the map. In this case, a sensor for detecting the actual rotation speed of the drive motor 3 may be provided.

In a step S190, a driving state of the vehicle is detected. In a step S200, a charging power limit Pgenlmt is calculated from the detected driving state. The processings in the steps S190 and S200 will be described below in detail.

The driving state refers to a vehicular state including vehicle speed and/or acceleration, and an environmental condition including road surface condition and/or gradient. The vehicular state is obtained from a vehicle speed and a brake depression amount. The environmental condition is obtained from a car navigation system 51 or the like.

Figure 6:
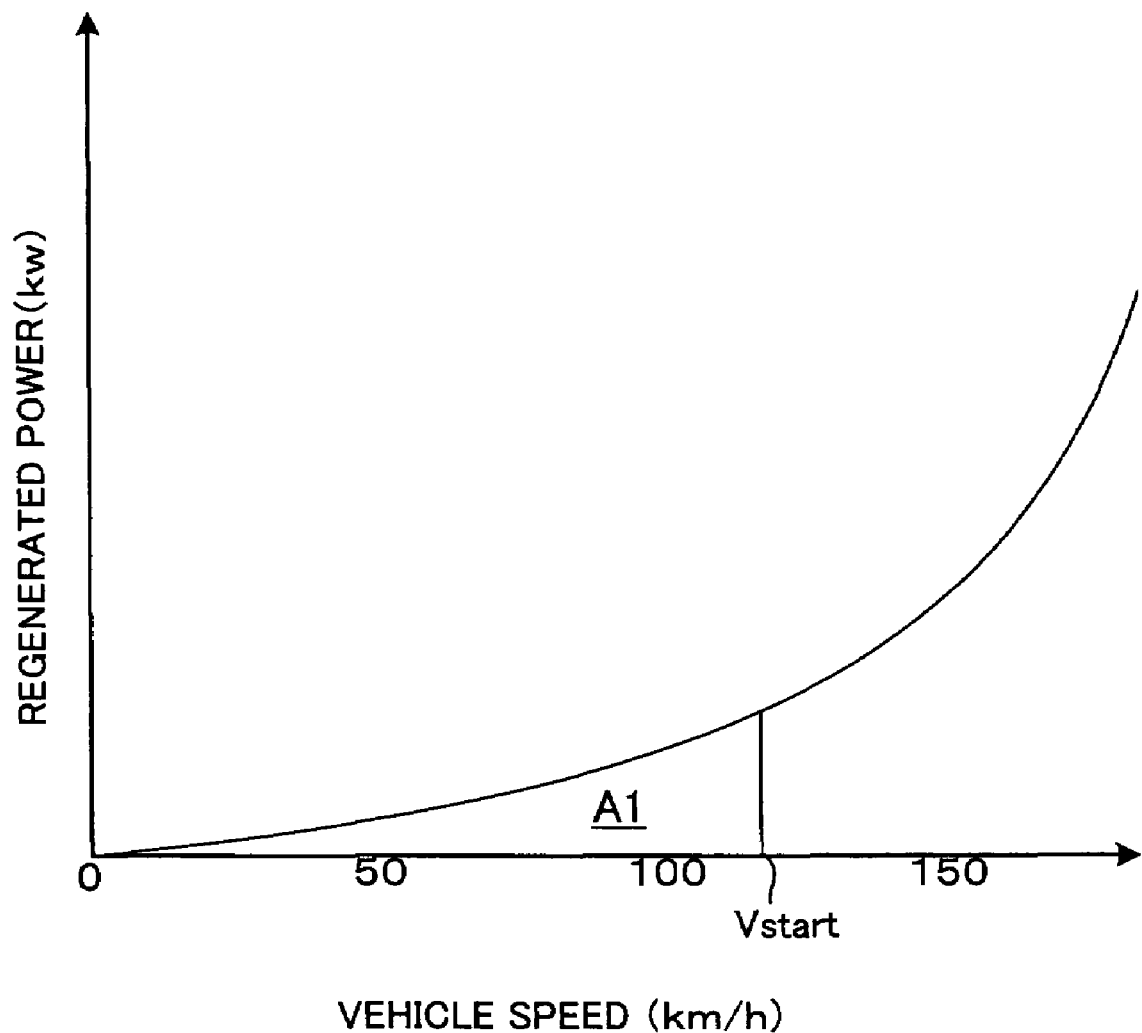
FIG. 6 is a map showing how the power regenerated by a drive motor is related to vehicle speed.

When the vehicle speed is used as the driving state, a regenerated energy amount E to be regenerated resulting from regenerative braking may be estimated from the map in FIG. 6. Referring to FIG. 6, the axes of abscissa and ordinate represent vehicle speed and the magnitude of regenerated power, respectively. By referring to this map, the main controller 9 can determine a regenerated power profile from the start of coasting regeneration to the stop of the vehicle (the end of regeneration) on the basis of the vehicle speed at the start of coasting. In coasting regeneration where the vehicle coasts, the depression amount APS of the accelerator pedal 12 and the depression amount BRK of the brake pedal 13 are zero and thus the drive motor 3 is rotated through rotation of the coasting drive shaft 16 and thereby generates power. When the deceleration of the vehicle is substantially constant, an area A1 defined by the axis of abscissa and a curve illustrated in FIG. 6 corresponds to the regenerated energy amount E. Namely, in this case, the regenerated energy amount E is obtained by integrating regenerated power by vehicle speed. When the deceleration of the vehicle is not substantially constant during coasting regeneration, a regenerated energy amount may be obtained by calculating a deceleration from a periodically detected vehicle speed and integrating regenerated power by the vehicle speed while making sequential corrections based on the deceleration.

Figure 7:
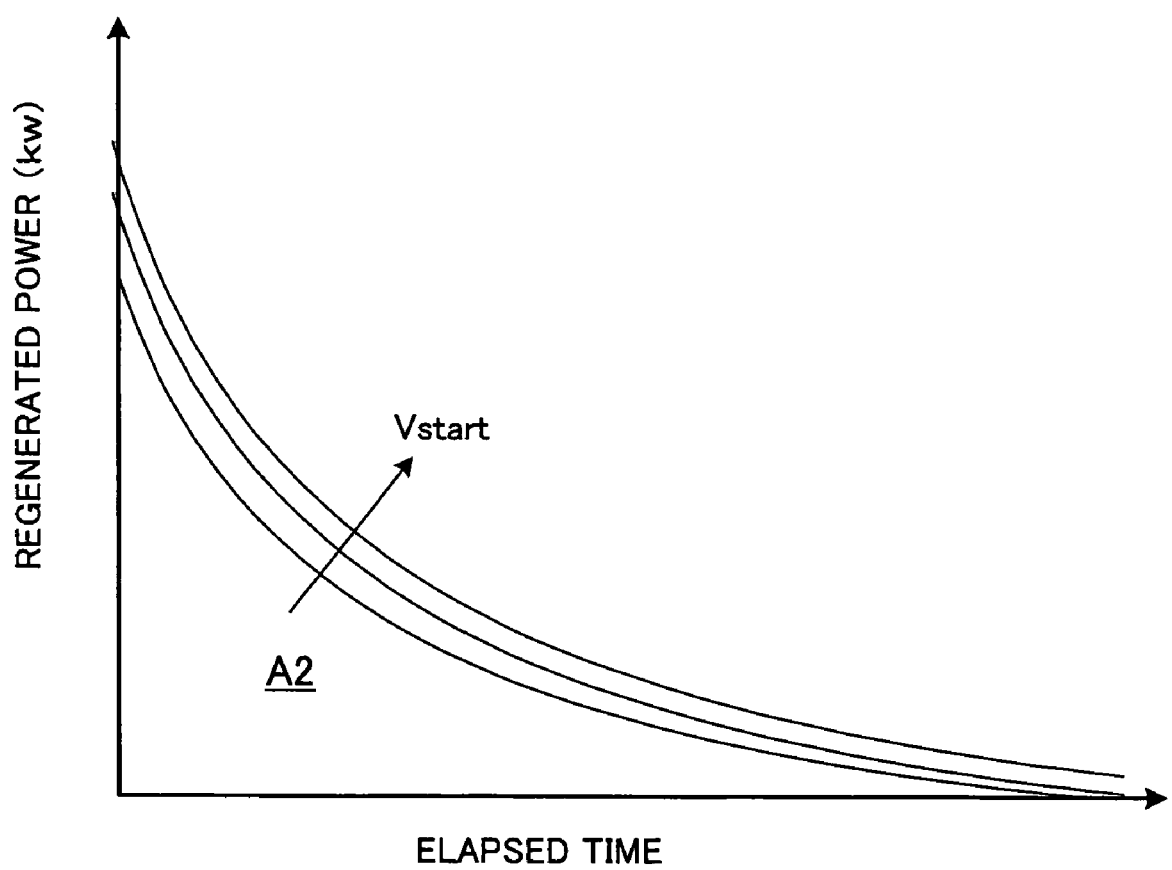
FIG. 7 is a map showing how the power regenerated by the drive motor is related to the time that has elapsed since the start of regeneration.

The regenerated energy amount to be regenerated resulting from regenerative braking may also be estimated from a map shown in FIG. 7. Referring to FIG. 7, the axes of ordinate and abscissa represent regenerated power and the time that has elapsed since the start of regeneration, respectively. This map represents a regenerated power profile from the start of coasting regeneration to the stop of the vehicle. As is the case with FIG. 6, an area A2 defined by a curve, the axis of abscissa, and the axis of ordinate in FIG. 7 corresponds to the regenerated energy amount E. Namely, the regenerated energy amount is obtained by integrating regenerated power by elapsed time. By referring to this map, a controller determines a regenerated power profile from the start of coasting regeneration to the stop of the vehicle (the end of regeneration) on the basis of the vehicle speed Vstart at the start of coasting (i.e., the vehicle speed in starting regeneration).

By reference to FIGS. 6 and 7, it is revealed that regenerated power increases as the vehicle speed Vstart in starting coasting increases, and that the regenerated energy amount E increases as regenerated power increases.

When the brake depression amount BRK is used as a driving state, a regenerated power can be calculated directly from the brake depression amount BRK (regenerative motor torque command value). While it is appropriate to estimate a regenerated energy amount E on the assumption that a certain regenerated power remains unchanged, it is also appropriate to estimate a regenerated power profile by combining the brake depression amount BRK with vehicle speed or deceleration.

When the environmental condition obtained from the car navigation system 51 is used as a driving state, a vehicle speed pattern is estimated from routes, signals, gradients, and the like. A target drive torque Tsd is calculated according to the vehicle speed pattern, and a regenerated power profile is estimated from the target drive torque Tsd and the rotation speed Ndrive of the drive motor 3.

In the step S190, the regenerated energy profile or the regenerated energy amount E is estimated as described above.

In the step S200, with a view to reducing the amount of change in the charging power with which the electric power storage device 6 is charged during regeneration, the charging power limit Pgenlmt is calculated on the basis of the regenerated power profile or the regenerated energy amount E. The charging power limit Pgenlmt may be set smaller as the estimated regenerated energy amount E increases. The charging power limit Pgenlmt may be set greater as the average regenerated power increases. In addition, the charging power limit Pgenlmt may be set such that the electric power storage device 6 is just fully charged when the estimated amount E of regenerated energy has been regenerated.

Figure 8:
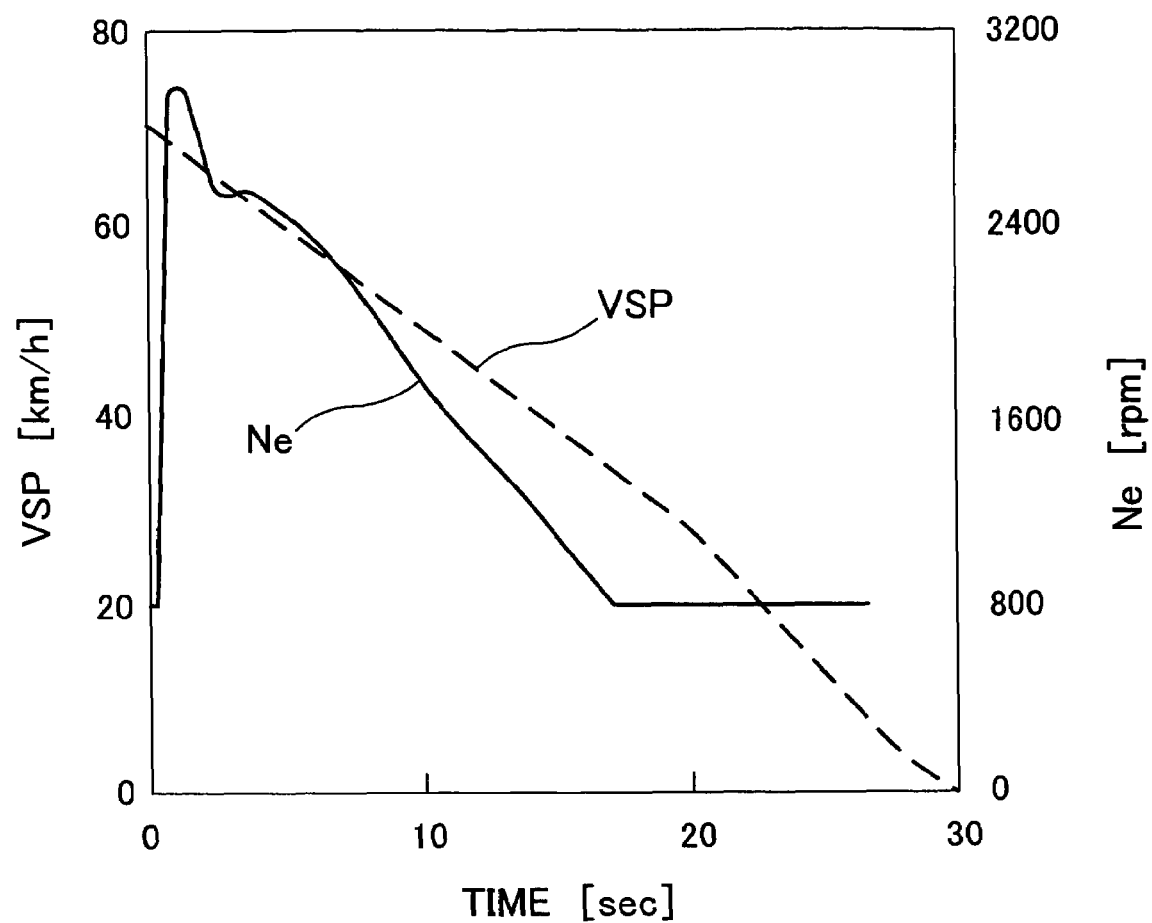
FIG. 8 is a graph showing how vehicle speed and engine rotation speed change with the lapse of time in the case where there is a limit to charging power.
Figure 9:
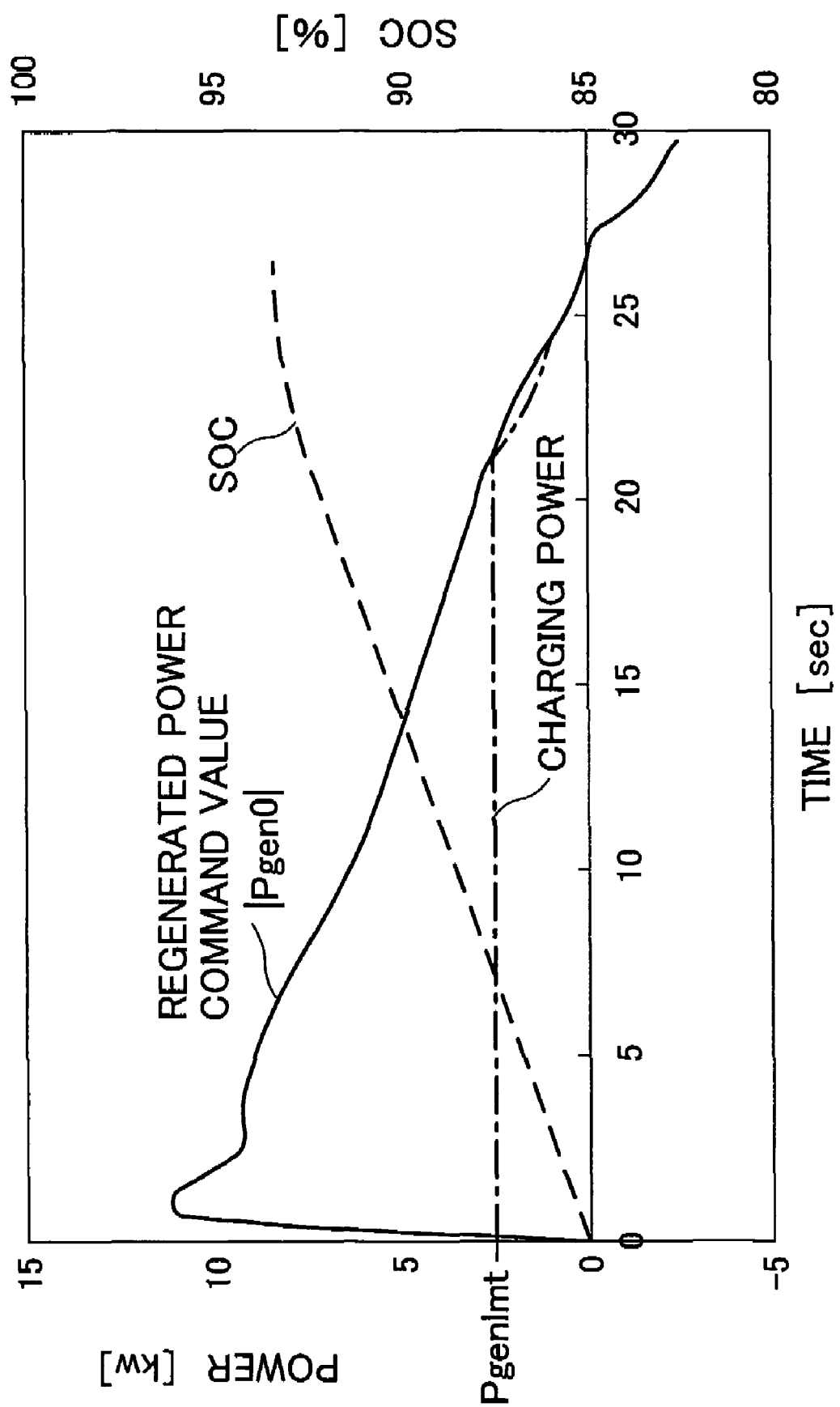
FIG. 9 is a graph showing how a regenerated-power command value, charging power, and an accumulation state (state of charge (SOC)) of an electric power storage device change with the lapse of time in the case where the charging power is limited to 2.6 kw.

By reference to FIGS. 8 and 9, it is revealed that the amount of change in charging power during regeneration is reduced by setting the limit Pgenlmt for charging power.

Figure 11:
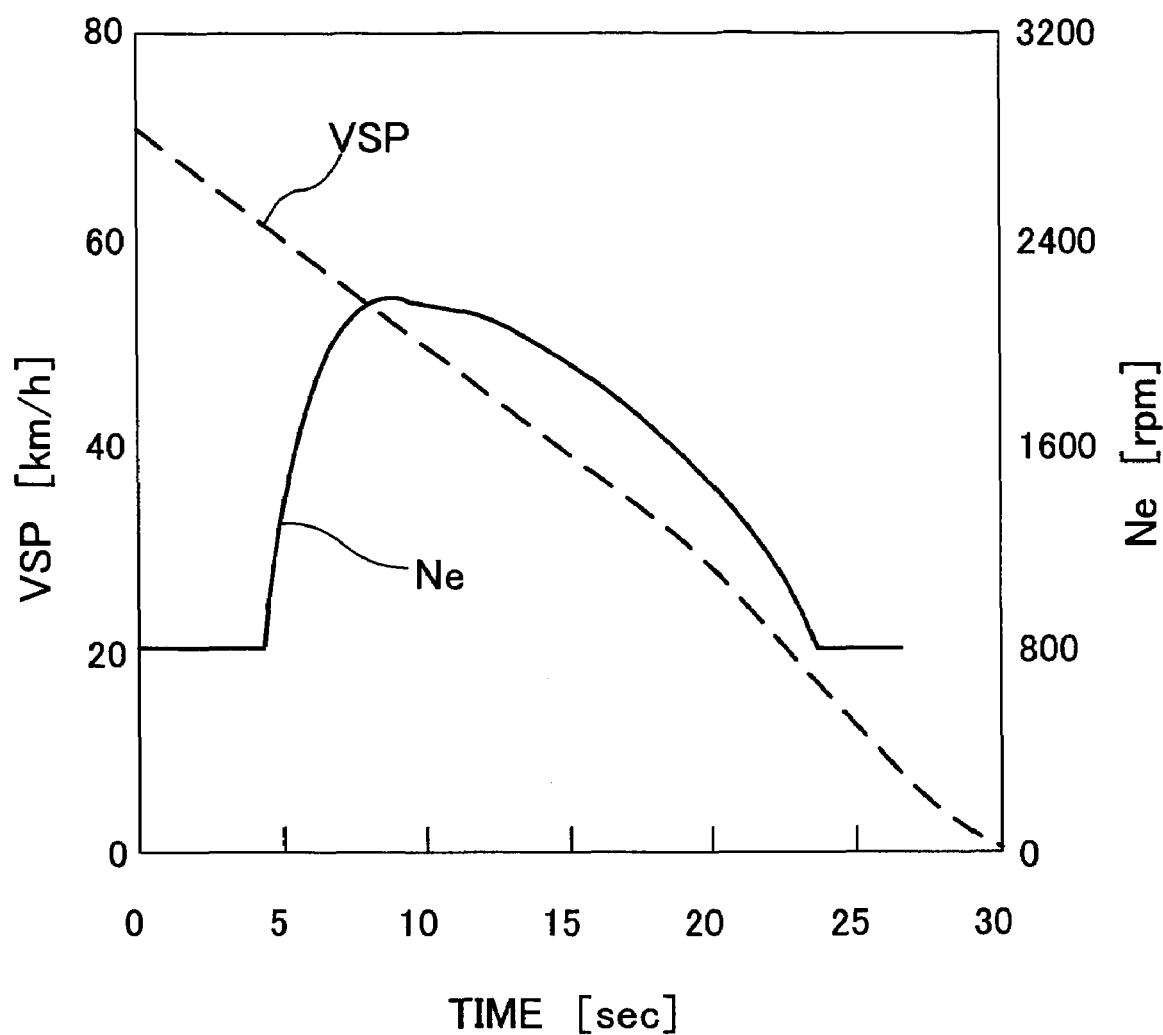
FIG. 11 is a graph showing how vehicle speed and engine rotation speed change with the lapse of time in the case where there is no charging power limit set by a controller or the like (prior art).

FIG. 8 shows how vehicle speed and engine rotation speed change in the case where coasting regeneration is started as soon as a hybrid vehicle employing a capacitor with an energy capacity of 150 wh as an electric power storage device reaches a vehicle speed of 70 km/h and where the charging power limit Pgenlmt is set to 2.6 kw. FIG. 9 shows how the regeneration command value, the charging power, and the SOC of the capacitor change in this case. As regards the case of the prior art where there is no charging power limit set by a controller, FIG. 11 shows how vehicle speed and engine rotation speed change, and FIG. 12 shows how the regeneration command value, the charging power, and the SOC of the capacitor change.

Figure 12:
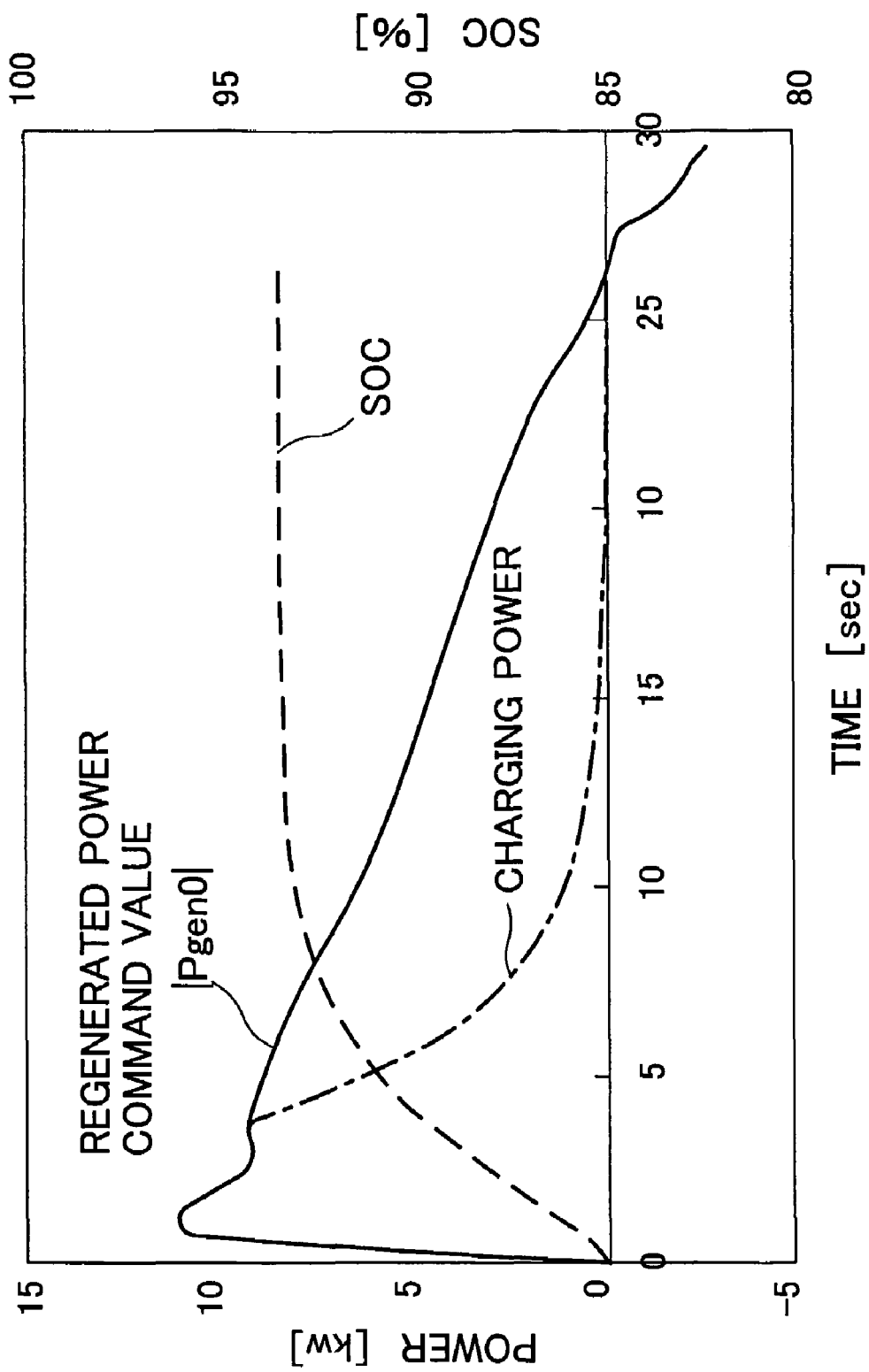
FIG. 12 is a graph showing how the regenerated-power command value, the charging power, and the accumulation state of the electric power storage device change with the lapse of time in the case where there is no charging power limit set by a controller or the like (prior art).

Referring to FIG. 12, the regenerated power starts deviating from the regeneration command value approximately four seconds after the start of coasting regeneration. This is because regeneration has caused an abrupt increase in SOC and thus imposed a limit on the charging power for charging the capacitor in the vicinity of its fully charged state. To maintain a desired coasting braking force, the rotation speed of the engine (=the rotation speed of the motor/generator 2) changes to allow the motor/generator 2 to consume a power equal to the surplus power (regenerated power−chargeable power). Thus, as shown in FIG. 11, the engine rotation speed abruptly changes about four to nine seconds after the start of coasting regeneration. In this case, since the engine rushes during coasting of the vehicle, the driver of the vehicle feels uncomfortable.

On the other hand, when the charging power is limited to 2.6 kw, as is apparent from FIG. 9, the charging power does not abruptly change during coasting. Thus, referring to FIG. 8, the engine rotation speed no longer changes abruptly after having abruptly risen immediately after the start of coasting. Even when the engine rotation speed has abruptly risen immediately after the start of coasting, the driver seldom feels uncomfortable because the driver is usually in the habit of releasing the accelerator pedal or treading on the brake pedal immediately after the start of coasting.

Figure 10:
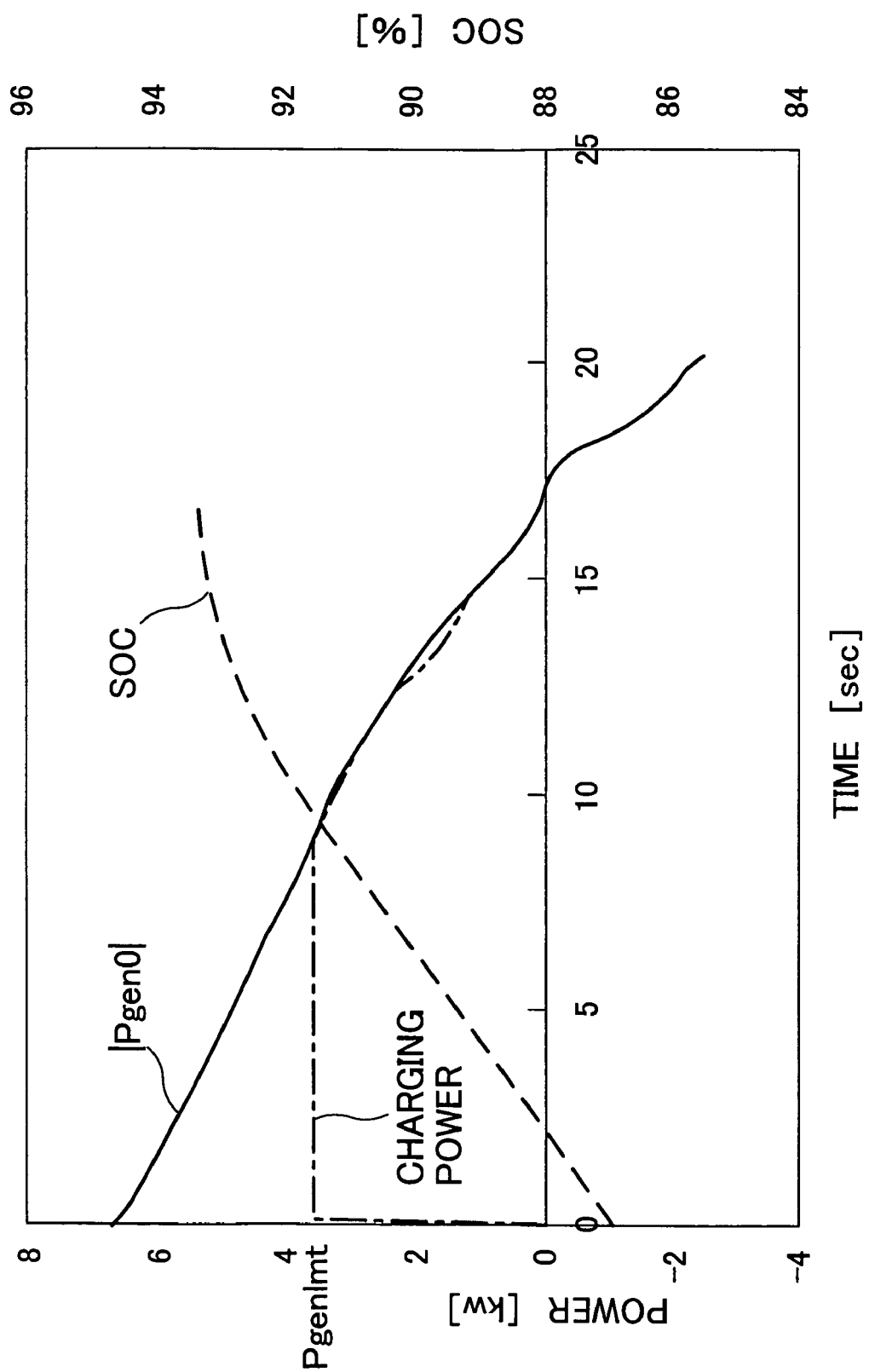
FIG. 10 is a graph showing how the regenerated-power command value, the charging power, and the accumulation state of the electric power storage device change with the lapse of time in the case where the charging power is limited to 3.5 kw.

FIG. 10 deals with a case where regeneration is started at a vehicle speed of 50 km/h. In FIG. 10, the charging power limit Pgenlmt is set to 3.5 kw, which is greater than 2.6 kw, that is, the limit in the case of FIG. 9. This is because the regenerated energy amount E is greater and the time for coasting is longer in starting coasting regeneration at 70 km/h as in the case shown in FIG. 6 than in starting coasting regeneration at 50 km/h. For the same charging power limit, the fully charged state of the electric power storage device 6 is achieved earlier and hence the amount of change in charging power is greater if coasting regeneration is started at 70 km/h. Therefore, in order to extend the time required for the achievement of the fully charged state by the electric power storage device 6, the charging power limit Pgenlmt may be set smaller as the amount of regenerated energy increases, that is, as the vehicle speed in starting regeneration increases. Thus, even when the regenerated energy amount E is great, the engine rotation speed can be prevented from abruptly changing owing to the fully charged state.

From the viewpoint of fuel economy, it is desirable to recover energy through regeneration to the greatest possible extent. For example, in the case where the amount of regenerated energy is constant, the coasting time T (i.e., the duration of regeneration from the start of coasting regeneration to the stop of the vehicle) is inversely proportional to the average regenerated power. By increasing the charging power limit Pgenlmt in conformity with the average regenerated power, more energy can be recovered. Thus, the charging power limit Pgenlmt may be set greater as the average regenerated power increases (i.e., as the duration of regeneration decreases).

Furthermore, in order to prevent regenerated energy from being wasted, the charging power limit Pgenlmt may be set such that the electric power storage device 6 is just fully charged when the estimated amount of regenerated energy has been regenerated. More specifically, using values obtained from the estimated regenerated power profile, that is, a coasting time T (sec) and an amount E (J) of energy recoverable in the electric power storage device 6, the charging power limit Pgenlmt is set to E/T (W). By thus setting the charging power limit Pgenlmt, it becomes possible to efficiently recover regenerated energy while preventing the engine rotation speed from changing abruptly.

The charging power limit may be increased immediately after the start of regeneration. This is because a lack of sufficient braking force (i.e., insufficient regeneration) may occur within a predetermined period after the start of the regeneration since the inertia of the engine does not allow the engine rotation speed (i.e. the rotation speed of the motor/generator 2) to rise to a predetermined speed. The lack of sufficient braking force can be prevented by setting the charging power limit greater than the aforementioned limit calculated from the regenerated power profile immediately after the start of regeneration until the engine rotation speed reaches a desired value.

Figure 13:
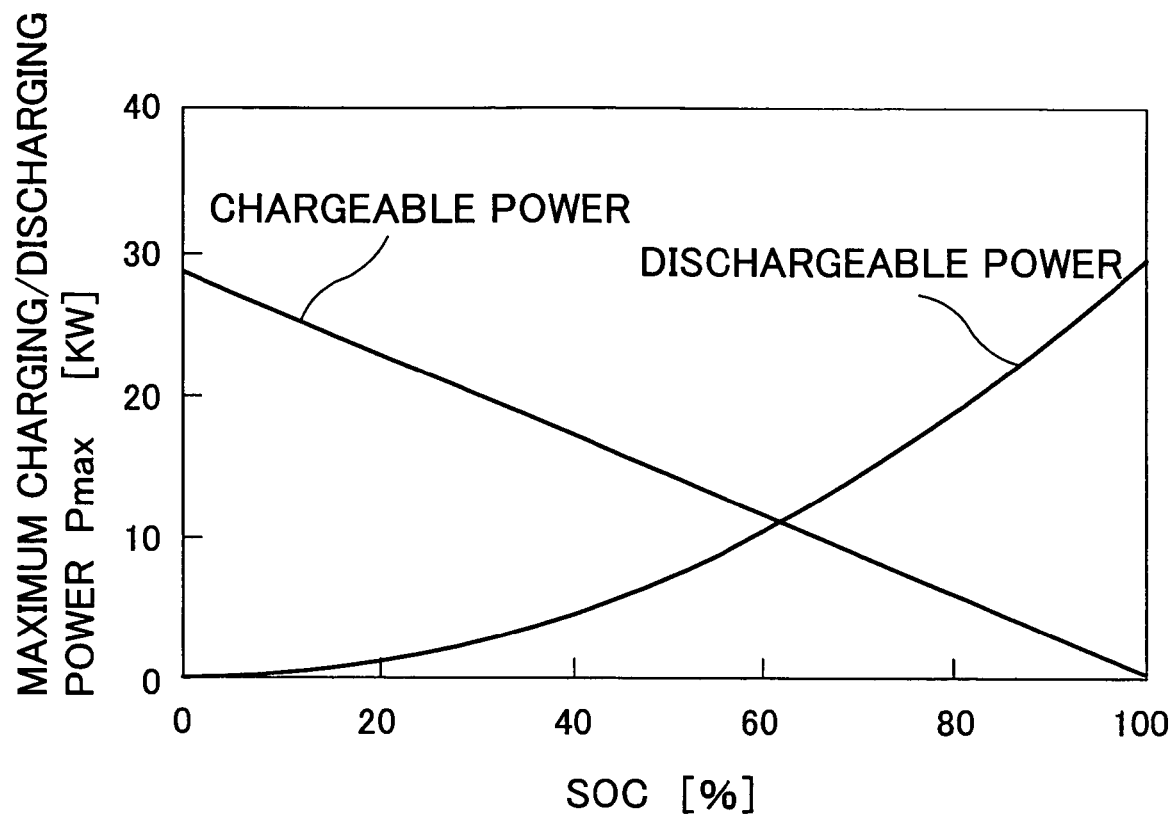
FIG. 13 is a map defining how the accumulation state (SOC) of the electric power storage device is related to chargeable/dischargeable power (the power that can be input/output to the electric power storage device).

Referring again to FIG. 2, in a step S210, a chargeable/dischargeable power Pmax in the electric power storage device 6 is calculated. Using a map or function defining a relationship between SOC and Pmax, the chargeable/dischargeable power Pmax is calculated from a current value of SOC. For example, a map shown in FIG. 13 may be experimentally obtained in advance and stored into the memory. In general, the chargeable power Pmax decreases in conformity with increases in SOC, and reaches zero when the SOC is 100%. In general, the dischargeable power Pmax increases in conformity with increases in SOC, and reaches zero when the SOC is 0%.

In a step S220, in consideration of the charging power limit Pgenlmt or the chargeable/dischargeable power Pmax in the electric power storage device 6 (i.e., the power that can be input to and output from the electric power storage device 6), a target generated power Pgen generated by the motor/generator 2 is calculated from the temporary target generated power Pgen0.

When the charging power limit Pgenlmt is greater than the chargeable power Pmax and the electric power storage device 6 is capable of accepting the entire regenerated power (i.e., when |Pgenlmt|>|Pmax| and |Pgen0|≦|Pmax|), the target generated power Pgen generated by the motor/generator 2 during regenerative braking is set to zero (Pgen=0). It should be noted that |Pgen0| (=−Pgen0) represents the power regenerated by the drive motor 3.

When the charging power limit Pgenlmt is greater than the chargeable power Pmax and the electric power storage device 6 is incapable of accepting the entire regenerated power (i.e., when |Pgenlmt|>|Pmax| and |Pgen0|>|Pmax|), the target generated power Pgen is set to a negative value −(|Pgen0|−|Pmax|). In this case, the motor/generator 2 functions as the power consumption means for consuming power. In other words, a target consumed power Pcom (=−Pgen) is set to |Pgen0|−|Pmax| (Pcom=|Pgen0|−|Pmax|). The target consumed power |Pgen| represents the power that is consumed by rotating the motor/generator 2 while the supply of fuel to the engine 1 is stopped (i.e., through so-called motoring).

In addition, a chargeable energy amount Ecap is calculated on the basis of a difference between the value of SOC in the fully charged state and a detected value of SOC, and it is determined whether or not the regenerated energy amount E is greater than the chargeable energy amount Ecap.

When the charging power limit Pgenlmt is smaller than the chargeable power Pmax and the regenerated energy amount E is greater than the chargeable energy amount Ecap (i.e., when |Pgenlmt|≦|Pmax| and E>Ecap), the target generated power Pgen generated by the motor/generator 2 during regeneration is set to −(|Pgen0|−|Pgenlmt|). In other words, the target consumed power Pcom (=−Pgen) is set to |Pgen0|−|Pgenlmt| (Pcom=|Pgen0|−|Pgenlmt|). When |Pgen0|>|Pgenlmt|, the motor/generator 2 consumes power. When |Pgen0|<|Pgenlmt|, the motor/generator 2 generates power, so the electric power storage device 6 is charged with both the power from the drive motor 3 and the power from the motor/generator 2.

When the charging power limit Pgenlmt is smaller than the chargeable power Pmax and the regenerated energy amount E is smaller than the chargeable energy amount Ecap (i.e., when |Pgenlmt|≦|Pmax| and E<Ecap), the electric power storage device 6 is not fully charged by regeneration, so the target generated power Pgen is basically set to zero (Pgen=0). Furthermore in this case, when |Pgen0|>|Pmax|, the target generated power Pgen may be set to −(|Pgen0|−|Pmax|).

In the step S220, actually, a value obtained by adding a discharged power to the temporary target generated power Pgen0 may be used as the temporary target generated power when the SOC of the electric power storage device 6 is high, while a value obtained by adding a charging power to Pgen0 may be used as the temporary target generated power when the SOC of the electric power storage device 6 is low.

In a step S230, a loss Ploss2 caused in generating power by means of the motor/generator 2 is estimated, and a target engine output Pse is calculated by adding the loss Ploss2 to the target generated power Pgen (Pse=Ploss2+Pgen).

One method of calculating the loss Ploss2 in the motor/generator 2 includes the preparation of a map or table defining a relationship between the target generated power Pgen and the loss Ploss2, and the calculation of the loss Ploss2 from the map or table. The map or table is prepared by checking the loss Ploss2 in the motor/generator 2 at an operating point attaining optimal fuel economy when the target generated power Pgen is generated by the motor/generator 2. Another method of calculating the loss Ploss2 in the motor/generator 2 includes the preparation of a motor/generator loss map through measurement of the loss Ploss2 for each set of the power generated by the motor/generator 2 and the rotation speed thereof, and the calculation of the loss Ploss2 from the generated power and the rotation speed with reference to the map.

In a step S240, an actual engine rotation speed Ne is detected by an engine rotation speed detecting sensor 25.

In a step S250, the engine torque command value Ts is calculated by dividing the target engine output Pse by the actual engine rotation speed Ne (Ts=Pse/Ne).

The engine torque command value Ts and the fuel cut signal fcut generated in the step S150 are transmitted to the engine controller 7, and the throttle opening and fuel injection amount of the engine 1 are controlled on the basis of those values.

Figure 4:
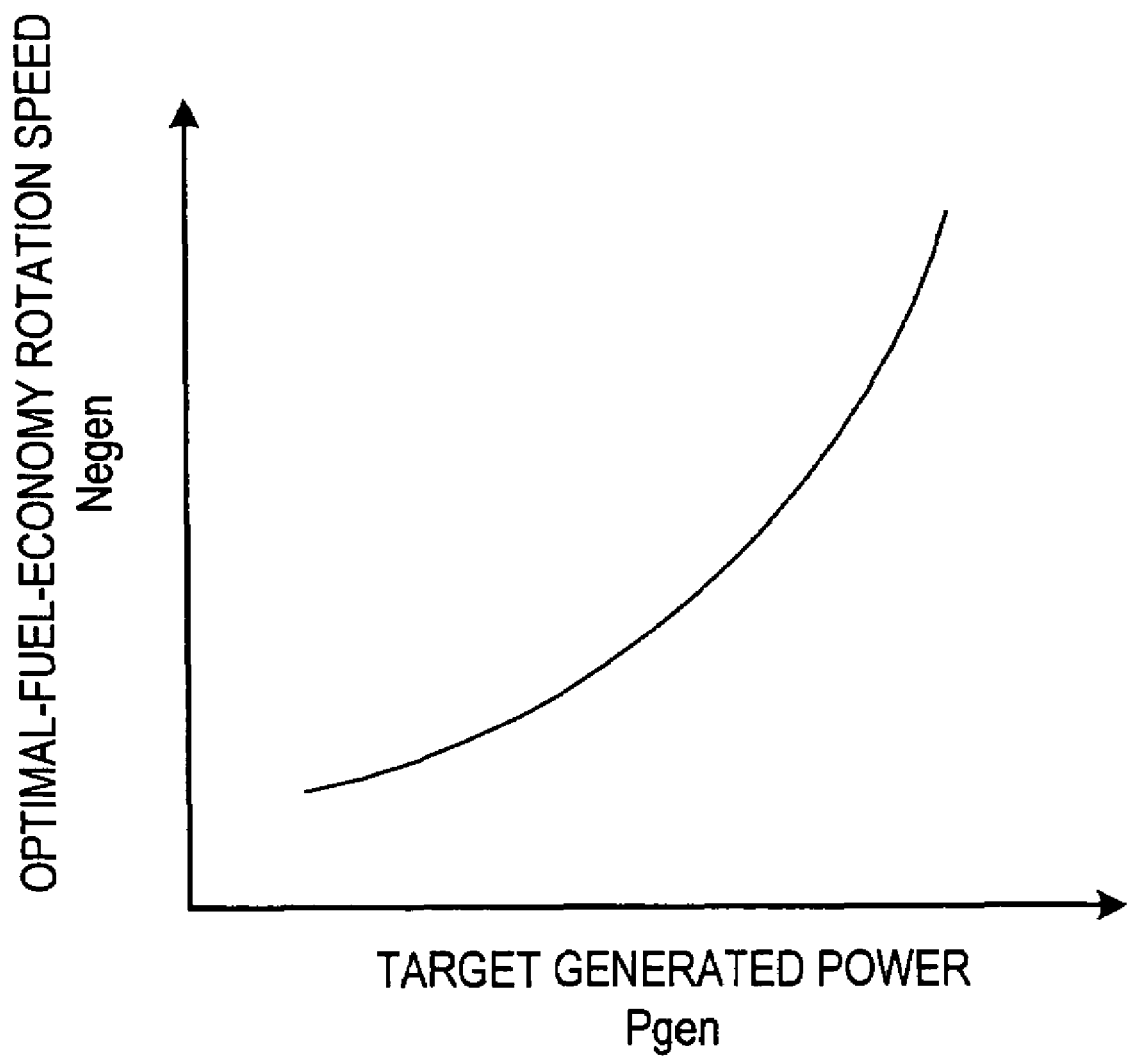
FIG. 4 is a map defining how optimal-fuel-economy engine rotation speed attaining optimal fuel economy is related to the power generated by a power-generating motor.

In a step S260, using the map shown in FIG. 4, an optimal-fuel-economy engine rotation speed Negen, which is a rotation speed attaining optimal fuel economy at an operating point of the engine 1 where the target generated power Pgen is output, is calculated. Referring to the map in FIG. 4, the axes of ordinate and abscissa represent the optimal-fuel-economy rotation speed Negen and the target generated power Pgen respectively, and the optimal-fuel-economy engine rotation speed Negen increases as the target generated power Pgen increases. Since the engine 1 is connected to the motor/generator 2, the rotation speed of the engine 1 is equal to the rotation speed of the motor/generator 2.

Figure 5:
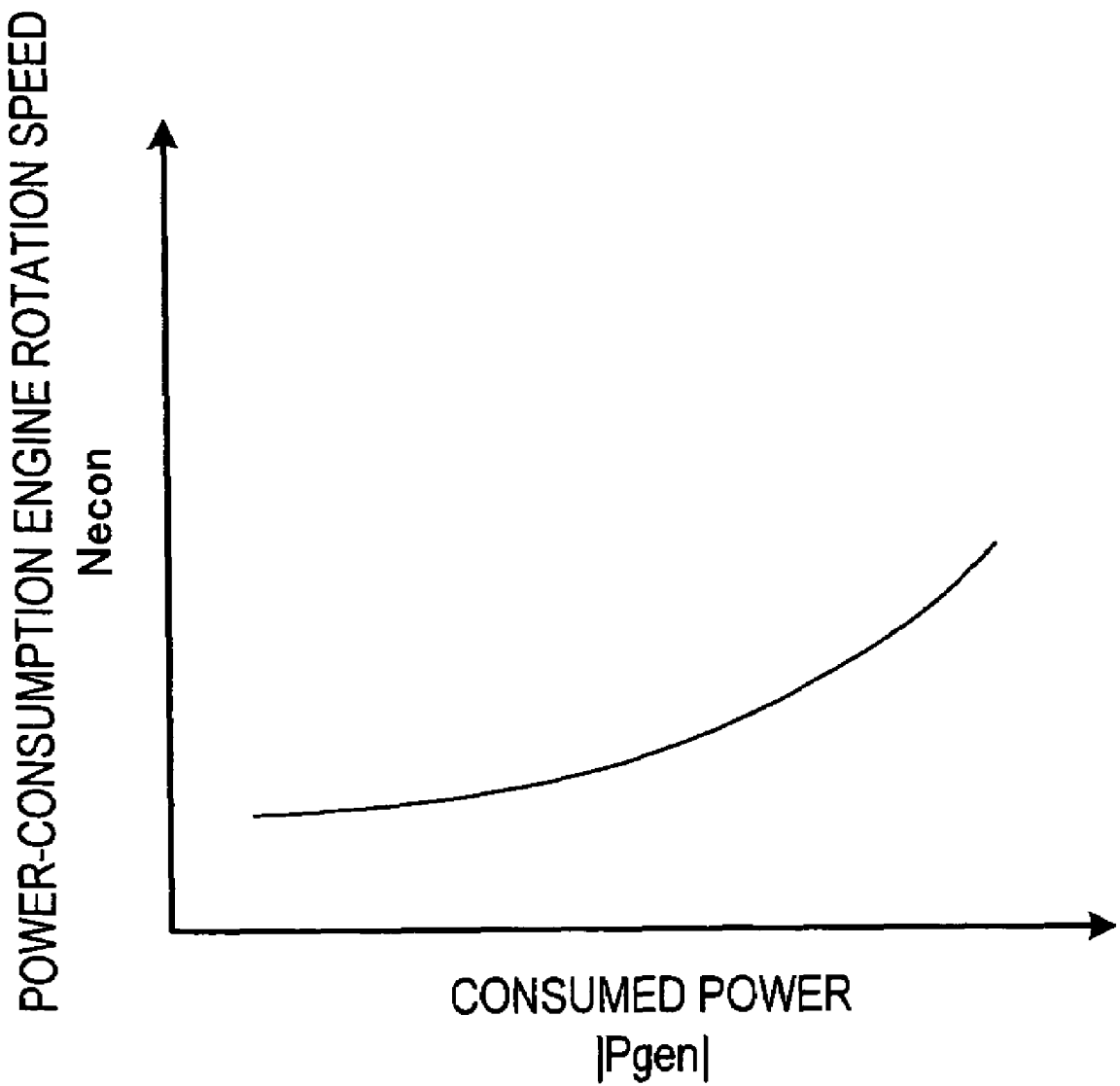
FIG. 5 shows how engine rotation speed is related to consumed power in the case where a motor/generator consumes power.

In a step S270, using the map shown in FIG. 5, an engine rotation speed Necon realizing a negative generated power Pgen (i.e., a positive consumed power |Pgen| where power is consumed) is calculated. Referring to the map in FIG. 5, the axes of ordinate and abscissa represent the power-consumption engine rotation speed Necon and consumed power |Pgen| respectively. The power-consumption engine rotation speed Necon increases as the consumed power |Pgen| increases.

In a step S280, when the target generated power Pgen is positive (Pgen>0), the rotation speed command value Ns for the motor/generator is set to the optimal-fuel-economy engine rotation speed Negen (Ns=Negen). When the target generated power Pgen is negative (Pgen<0), the rotation speed command value Ns for the motor/generator 2 is set to the power-consumption engine rotation speed Necon (Ns=Necon).

The thus-set rotation speed command value Ns for the motor/generator is transmitted to the motor/generator controller 8. The motor/generator controller 8 calculates a torque command value such that the actual rotation speed of the motor/generator 2 becomes equal to the rotation speed command value Ns for the motor/generator, and performs vector control of the motor/generator 2. Since the engine 1 is connected to the motor/generator 2, the rotation speed of the engine 1 is equal to the rotation speed of the motor/generator 2. Therefore, if the rotation speed of the motor/generator 2 is set to the rotation speed command value Ns, the rotation speed Ne of the engine 1 is also set to the rotation speed command value Ns. As a result, the optimal-fuel-economy engine rotation speed Negen or the power-consumption engine rotation speed Necon is realized.

Figure 2A:
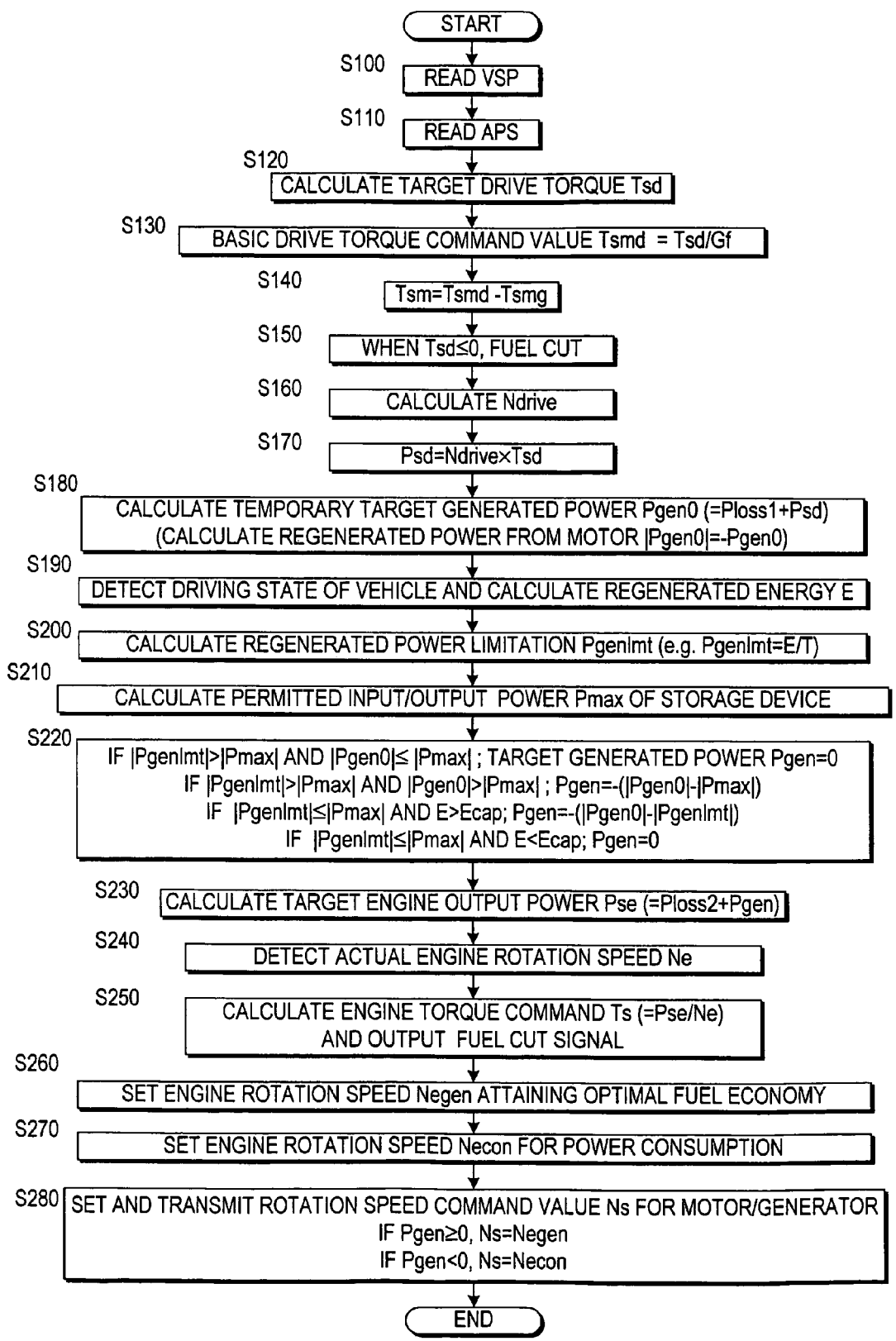
FIG. 2A is a flowchart showing the control routine of the embodiment.

FIG. 2A is a flowchart showing the above-described control routine intelligibly.

As described above, the power with which the electric power storage device 6 is charged is limited on the basis of the regenerated energy amount E and the chargeable energy amount Ecap in the electric power storage device 6. The target generated power Pgen of the motor/generator 2 is calculated. Based on the value of Pgen, the rotation command value Ns for the motor/generator is calculated, and also, the target engine output Pse is calculated.

The effects of this embodiment will now be described.

A regenerated energy resulting from regenerative braking is estimated from a driving state of the vehicle. When it is determined that the electric power storage device 6 cannot entirely recover the estimated amount of regenerated energy from the drive motor, a regenerated power limit is calculated such that the amount of change in the charging power with which the electric power storage device 6 is charged becomes small. Thus, the charging power is prevented from changing abruptly during coasting regeneration (exclusive of a timing immediately following the start of coasting regeneration). Consequently, the engine rotation speed is prevented from changing abruptly during regenerative braking, and therefore, the discomfort of the driver is alleviated.

A regenerated power profile resulting from regenerative braking is estimated from a driving state of the vehicle. When it is determined that the electric power storage device 6 cannot recover regenerated power according to the estimated regenerated power profile, namely, when the regenerated power from the drive motor 3 is expected to exceed a charging power owing to the fully charged state of the electric power storage device, the charging power is limited so as to reduce the change amount of the charging power.

If the charging power limit is reduced as the estimated amount of regenerated energy increases (i.e., as the vehicle speed in starting regeneration increases), the engine rotation speed is prevented from changing abruptly even when the amount of regenerated energy is great.

If the charging power limit is increased as the average regenerated power for the estimated regenerated energy amount increases (i.e., as the duration of regeneration is reduced), regenerated energy can be prevented from being wasted.

The charging power limit is calculated to allow the electric power storage device 6 to be fully charged within the duration of regeneration which is obtained from the estimated regenerated power profile. Thus, while the energy recoverable in the electric power storage device 6 is not wasted, the rotation speed of the engine is prevented from changing abruptly.

Immediately after the start of regeneration, the charging power limit may be set greater than a value calculated from the regenerated power profile. In this case, it is possible to prevent a rise in regenerative braking force from being delayed immediately after the start of regeneration.

Because the amount of regenerated energy and the profile of regenerated power are estimated according to vehicle speed, there is no need to provide any other sensor than a vehicle speed sensor which is usually installed in the vehicle.

The regenerated power profile may be obtained from the depression amount of the brake. In this case, the regenerated power profile can be estimated more accurately.

A target drive torque profile of the vehicle may be anticipated from car navigation system information or the like, and the regenerated power profile may be obtained according to the anticipated target drive torque profile. The regenerated power profile, inclusive of road gradient, is estimated.

This embodiment is also applicable to parallel hybrid vehicles. In both parallel hybrid vehicles and series hybrid vehicles, the dynamic force of either an engine or a motor is transmitted to a drive shaft. In the parallel hybrid vehicle, the engine is rotated by a drive torque applied to wheels. When the accumulation of more power is possible, it is desirable to recover the entire regenerated energy. Therefore, it is desirable to connect the drive motor with the engine via a clutch.

To suitably adjust the burden for regeneration of the engine as in the case of this embodiment, it is desirable that a hybrid vehicle comprise a continuously variable transmission. Even in the case where a hybrid vehicle comprises a multiple stage transmission, appropriate adjustment of regenerated power according to a change gear ratio makes it possible to achieve an effect identical or similar to that of the hybrid vehicle comprising a continuously variable transmission.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

The entire contents of Japanese Patent Application P2004-56032 (filed Mar. 1, 2004) are incorporated herein by reference.

What is claimed is:

1. A control apparatus for a hybrid vehicle comprising an engine, a drive motor that regenerates power, and an electric power storage device that gives/receives power to/from the drive motor, wherein a driving force from at least one of the engine and the drive motor is transmitted to a drive shaft of the vehicle, comprising:

power consumption means for consuming power;

a sensor that detects a state of charge of the electric power storage device;

means for detecting a driving state of the vehicle; and a controller programmed to:

calculate a chargeable energy amount in the electric power storage device on the basis of a difference between a fully charged state of the electric power storage device and the detected state of charge;

set a power regenerated by the drive motor;

calculate a chargeable power in the electric power storage device according to the detected state of charge;

calculate a regenerated energy resulting from regenerative braking from the detected driving state of the vehicle;

calculate a charging power limit for preventing an abrupt change in charging power with which the electric power storage device is charged, according to the calculated regenerated energy; and control the power consumption means to consume a power equal to a difference between the power regenerated by the drive motor and the charging power limit when the calculated regenerated energy is greater than the chargeable energy amount in the electric power storage device and when the charging power limit is smaller than the chargeable power.

2. The control apparatus according to claim 1, wherein the regenerated energy comprises an amount of energy regenerated from a start of regeneration to an end of regeneration.

3. The control apparatus according to claim 2, wherein the charging power limit decreases as an estimated regenerated energy amount increases.

4. The control apparatus according to claim 1, wherein the controller is programmed to determine a regenerated power profile from the start of regeneration to the end of regeneration from the driving state of the vehicle and calculate the regenerated energy with reference to the regenerated power profile.

5. The control apparatus according to claim 4, wherein the controller is programmed to set the charging power limit greater as an average regenerated power of the regenerated power profile increases.

6. The control apparatus according to claim 4, wherein means for detecting a driving state of the vehicle comprises a vehicle speed sensor for detecting a vehicle speed, and the controller is programmed to determine the regenerated power profile according to the detected vehicle speed.

7. The control apparatus according to claim 4, wherein means for detecting a driving state of the vehicle comprises a brake pedal sensor for detecting a depression amount of a brake pedal, and the controller is programmed to determine the regenerated power profile according to the detected depression amount of the brake pedal.

8. The control apparatus according to claim 1, wherein the controller is programmed to obtain a duration of regeneration from the regenerated power profile and calculate the charging power limit to allow the electric power storage device to be fully charged within the duration of regeneration.

9. The control apparatus according to claim 1, wherein the controller is programmed to set another limit greater than the calculated charging power limit immediately after the start of regeneration, and control the power consumption means to consume a power equal to a difference between the power regenerated by the drive motor and the other limit.

10. The control apparatus according to claim 1, wherein means for detecting a driving state of the vehicle comprises a vehicle speed sensor for detecting a vehicle speed, and
the controller is programmed to calculate the regenerated energy according to the detected vehicle speed.

11. The control apparatus according to claim 1, wherein the controller comprises means that anticipates a target drive torque profile of the vehicle on the basis of information from a car navigation system, the controller is programmed to calculate the regenerated energy according to the target drive torque profile.

12. A hybrid vehicle comprising the control apparatus according to claim 1.

13. A control apparatus for a hybrid vehicle comprising an engine, a drive motor that regenerates power, and an electric power storage device that gives/receives power to/from the drive motor, wherein a driving force from at least one of the engine and the drive motor is transmitted to a drive shaft of the vehicle, comprising:
   first means for consuming power;
   second means for detecting a state of charge of the electric power storage device;
   third means for detecting a driving state of the vehicle;
   fourth means for calculating a chargeable energy amount in the electric power storage device on the basis of a difference between a fully charged state of the electric power storage device and the detected state of charge;
   fifth means for setting a power regenerated by the drive motor;
   sixth means for calculating a chargeable power in the electric power storage device according to the detected state of charge;
   seventh means for calculating a regenerated energy resulting from regenerative braking from the detected driving state of the vehicle;
   eighth means for calculating a charging power limit for preventing an abrupt change in charging power with which the electric power storage device is charged, according to the calculated regenerated energy; and
   ninth means for controlling the first means to consume a power equal to a difference between the power regenerated by the drive motor and the charging power limit when the calculated regenerated energy is greater than the chargeable energy amount in the electric power storage device and when the charging power limit is smaller than the chargeable power.

14. A control method for a hybrid vehicle comprising an engine, a drive motor that regenerates power, an electric power storage device that gives/receives power to/from the drive motor, and power consumption means for consuming power, wherein a driving force from at least one of the engine and the drive motor is transmitted to a drive shaft of the vehicle, comprising:
   detecting a state of charge of the electric power storage device;
   detecting a driving state of the vehicle;
   calculating a chargeable energy amount in the electric power storage device on the basis of a difference between a fully charged state of the electric power storage device and the detected state of charge;
   setting a power regenerated by the drive motor;
   calculating a chargeable power in the electric power storage device according to the detected state of charge;
   calculating a regenerated energy resulting from regenerative braking from the detected driving state of the vehicle;
   calculating a charging power limit for preventing an abrupt change in charging power with which the electric power storage device is charged, according to the calculated regenerated energy; and
   controlling the power consumption means to consume a power equal to a difference between the power regenerated by the drive motor and the charging power limit when the calculated regenerated energy is greater than the chargeable energy amount in the electric power storage device and when the charging power limit is smaller than the chargeable power.

* * * * *